United States Patent [19]

Peniston et al.

[11] 4,195,175
[45] Mar. 25, 1980

[54] PROCESS FOR THE MANUFACTURE OF CHITOSAN

[76] Inventors: Quintin P. Peniston, Rte. 7, Box 7710, Bainbridge Island, Wash. 98110; Edwin L. Johnson, Rte. 5, Box 4246, Issaquah, Wash. 98027

[21] Appl. No.: 866,793

[22] Filed: Jan. 3, 1978

[51] Int. Cl.² ............................................ C08B 37/08
[52] U.S. Cl. ................................................ 536/20; 536/4
[58] Field of Search ........................................... 536/20

[56] References Cited

U.S. PATENT DOCUMENTS

| | | | |
|---|---|---|---|
| 2,040,879 | 5/1936 | Rigby | 536/20 |
| 2,040,880 | 5/1936 | Rigby | 536/20 |
| 2,842,049 | 7/1958 | Delangner | 536/20 |

*Primary Examiner*—Johnnie R. Brown
*Assistant Examiner*—Blondel Hazel
*Attorney, Agent, or Firm*—Rines and Rines, Shapiro and Shapiro

[57] ABSTRACT

This invention deals with a novel process of manufacturing chitosan from chitin with reduced temperatures, increased reaction rates involving higher alkali-to-solids deacetylation ratios, and a quiescent air-expelled final deacetylation step. Recovery of the alkali is also attainable.

3 Claims, 1 Drawing Figure

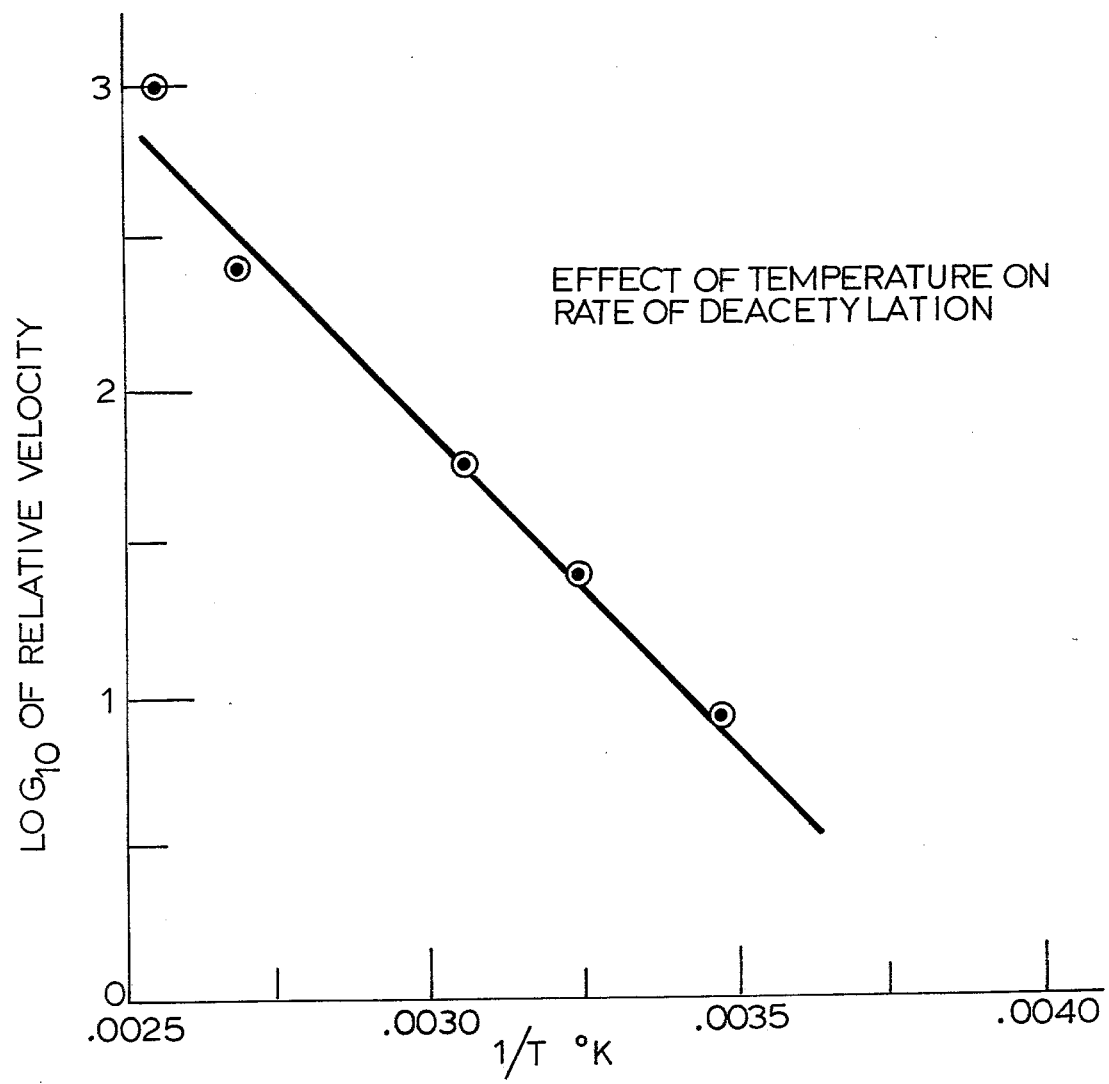

PROCESS FOR THE MANUFACTURE OF CHITOSAN

The present invention relates to processes for manufacturing chitosan from chitin, being more particularly directed to such manufacture as associated with the derivation of chitin from the sheels of crustacea and the like.

Chitosan is a modified natural carbohydrate polymer derived from chitin, which occurs principally in animals of the phyllum, arthropoda. The primary unit in the chitin polymer is 2-deoxy-2 (acetyl-amino) glucose. These units are combined by beta, 1-4 glycosidic linkages, forming a long chain linear polymer having a degree of polymerization of 2000-4000 primary units. Chitin is thus similar in structure to cellulose, differing only by the presence of the 2-acetyl-amino group in the glucose building unit. Chitin is insoluble in almost all solvents except strong mineral acids, notably nitric and hydrochloric.

When most of the acetyl groups of chitin are removed by treatment with strong alkalis, the product is chitosan, a high molecular weight linear polymer of 2-deoxy-2-amino glucose. The properties of chitosan relate to its polyelectrolyte and polymeric carbohydrate character. Thus, it is insoluble in water or in alkaline solutions at pH levels above about 6.5, or in organic solvents. It dissolves readily in dilute solutions of most organic acids such as formic, acetic, tartaric and citric acids, and also in dilute mineral acids, except sulfuric. In general, the amount of acid required to dissolve chitosan is approximately stoichiometric with the amino groups. It is also found that the degree of chitin deacetylation necessary to obtain a soluble product must be 80 to 85 percent or higher; i.e. the acetyl content of the chitosan product must be less than 4 to 4.5 percent, depending on extent of degradation accompanying the deacetylation procedure.

Chitosan is thus not a single, definite chemical entity, but varies in composition depending on conditions of manufacture. It may be equally defined as chitin sufficiently deacetylated to form soluble amine salts.

Solutions of chitosan are highly viscous, resembling those of natural gums. The cationic properties of the polymer lead to formation of complexes with anionic polyelectrolytes such as carboxy-methyl cellulose, and the reactivity of the amino group permits formation of stable gels with a variety of cross-linking agents. Many potential uses for chitosan have been developed, including flocculating agents for water and waste treatment, as described in our prior U.S. Pat. No. 3,533,940, a chelating agent for removal of traces of heavy metals from aqueous solutions, coating to improve dyeing characteristics of glass fibers, wet strength additives for paper, adhesives, photographic and printing applications, thickeners, formation of fibers and films, and many others. Other uses and processes are described in our further U.S. Pat. Nos. 3,862,122; 3,922,260 and 4,018,678. Commercial development of chitosan has, however, been hampered by the cost of manufacture and uncertainties of raw material supply which has been the shells of crustacea species, i.e. crab, shrimp, lobster, crayfish, etc.

Chitosan was first described by E. Gilson (Berichte 28 821 (1895); Bull (3) 11 1099 (1894)) as prepared by heating chitin with concentrated potassium hydroxide at 180° C., or by fusion with solid potassium hydroxide. Later investigators, notably Rigby (U.S. Pat. No. 2,040,879, May 1, 1936), having used alkali hydroxide, usually sodium hydroxide in concentrations from 30 to 60 percent by weight and temperatures from 80° to 160° C., to produce deacetylated chitin products ranging from 20 percent to complete deacetylation. In general, reaction times necessary to obtain soluble products, i.e., chitisan, were found to vary inversely with alkali concentration and temperature, but no consistent correlation of these variables seems to have been developed. In all cases, the ratio of sodium hydroxide solution to chitin used in deacetylation has been high, amounting to three or more parts of alkali hydroxide on a 100 percent basis per part of chitin. Agitation of the chitin-alkali mixture during reaction has also been considered necessary to obtain uniformity of product, and exclusion of air has been found necessary to minimize degradation.

The combination of high alkali concentration, high ratios of alkali solution to chitin treated, high reaction temperature, and agitation during reaction results in high cost for the conversion of chitin to chitosan. High temperature and high alkali concentration require corrosion resistant apparatus, generally all nickel or nickel lined, adding greatly to equipment costs. High ratios of alkali liquid to chitin increase equipment sizes for equal chitosan production and added chemical costs.

An object of the present invention is to provide a new and improved process for converting chitin to chitosan with substantially reduced cost, while improving the quality of products through reduced degradation, and under more mild conditions.

Other and further objects will be explained hereinafter and are more fully delineated in the appended claims.

In summary, from one of its aspects, the invention involves, in preferred form, a process for the deacetylation of ground chitin to yield a soluble chitosan product, that comprises, kneading the ground chitin with substantially 2 to 7 parts of substantially 35 to 50 percent sodium hydroxide solution, heating the resulting mixture to from substantially 40° to 80° C., packing the mixture in containers to expel entrapped air, sealing the containers and displacing residual air with nitrogen, holding the mixture in a quiescent state at substantially 40° to 80° C. for from substantially 160 to 40 hours, removing the alkali solution, and washing and drying the resulting chitosan product.

The invention will now be described in preferred form with reference to the accompanying drawing the single FIGURE of which is a graph illustrating the effect of temperature upon rate of deacetylation of chitin, enabling the improved results of the invention.

Hydrolysis of acetyl groups attached to nitrogen is generally more difficult than for those attached to oxygen. This is strongly accentuated in the deacetylation of chitin. We have found that a most satisfactory procedure for acetyl determination in chitin and partially deacetylated chitin products is the chromic-sulfuric acid digestion procedure of Wiesenberger (Mikrochemie 33 51-69 (1947)), in which the carbohydrate portion of the molecule is completely destroyed leaving only acetic acid for determination by distillation and titration. The strong resistance of chitin to deacetylation can probably be explained by the presence of hydrogen bonding between carbonyl and amide nitrogen groups of adjacent chitin chains in the micellar structure (see, for example, S. E. Darmon & K. M. Rudall, Disc. Farad. Soc. 9 251 (1950)); also by the dense packing of chains in the crystal lattice preventing access to reactive sites by deacetylating reagents (J. Blackwell, Biopolymers, Vol. 7, pp 281–298 (1969)).

We have also determined that chitin, as normally isolated from crustacea shells by protein dissolution and extraction, using mild alkali treatment followed by removal of calcium carbonate and phosphate by treatment with dilute acids, is not a uniform substance with regard to its ease of deacetylation. Rate curves for deacetylation appear to represent two independent simultaneous reactions and can be approximately fitted by an equation of the type:

Percent deacetylation $= Ae^{-K_1 t} + Be^{-K_2 t}$, where A represents the percent of the chitin existing as "amorphous" micellar regions, and B the percent of "crystalline" regions. A varies from 30 to 70 percent of the chitin depending on source and manner of chitin isolation. The rate constant, $K_1$, is generally found to be 15 to 20 times the rate constant $K_2$.

The deacetylation reaction is found to be strongly dependent on alkali concentration. Thus, the time required for deacetylation to 4.5 percent acetyl (a soluble chitosan product) in 50 weight percent sodium hydroxide at 120° C. is about four hours, while with 40 percent sodium hydroxide, about eight hours is required.

Temperature is also an important rate controlling factor. In a series of experiments, crab chitin with an average particle size of about 30 meshes to the inch, was treated with 2 parts of 50 percent sodium hydroxide per part of chitin. The materials were intimately mixed at room temperature using a kneading apparatus and were then packed in 2 ounce glass jars. These were sealed and held at various temperatures for time periods sufficient to reach total solubility of the deacetylated product. The results are shown in the following table and in the graph of the drawing that shows the substantially linear relationship between temperatures (plotted along the abcissa as 1/T in °K), and the rate of deacetylation (plotted logarithmically along the ordinate).

Rate of Chitin Deacetylation vs Temperature, 50% NaOH, 2:1 Liquor-to-Solids Ratio, Quiescent Conditions

| Temperature (°C.) | Time (hrs) | Relative Velocity |
|---|---|---|
| 120 | 4 | 1000 |
| 100 | 16 | 250 |
| 54 | 70 | 57 |
| 37 | 163 | 24.5 |
| 15 | 480 | 8.3 |

Near 60° C., the reaction rate doubles for about a 17° C. rise in temperature. This is a greater change with temperature than expected for a diffusion controlled reaction, but less than normal for a homogeneous deacetylation reaction.

The ratio of liquor-to-solids also is an important variable in determining the time required to obtain a soluble chitosan product. While the above experiments were run at a 2:1 liquor-to-solids ratio, this is insufficient liquor thoroughly to wet the chitin particles. The mixture is thus a discontinuous system of crumbs moistened with the alkali liquor. Swelling of the particles appears to be limited under these conditions so that alkali penetration into the fibrillar micelles is inhibited. This results in slower reaction during the latter part of the deacetylation reaction. Considerable improvement in reaction rate can, however, be achieved by using higher liquor-to-solids ratios, sufficient thoroughly to wet the chitin particles and to provide a continuous liquid phase.

Previous investigators, moreover, also do not appear to have considered recovery and reuse of the alkali used for deacetylation. The actual alkali consumption in deacetylation is only 40/203 = 0.20 pounds of sodium hydroxide per pound of chitin. Alkali added with a 10:1 liquor-to-solids ratio and 50 percent sodium hydroxide has been, by previous methods, about five pounds per pound of chitin. With 40 percent sodium hydroxide and a 5:1 liquor-to-solids ratio, as may be used in our quiescent procedure, added alkali is reduced to 2.0 pounds per pound of chitin. This can be further reduced by displacement washing of the chitosan to recover about half of the alkali at a concentration above 30 percent for reuse in the deacetylation. Perhaps among the reasons this has not previously been recognized in that degradation of chitin due to high temperatures and inadequate exclusion of air has heretofore resulted in a dark colored mother liquor with high impurity content. At temperatures of 60° to 80° C., and with good air exclusion in our quiescent procedure, on the other hand, there is hardly any discoloration of the mother liquor, and the sodium acetate formed in the process can be readily crystallized and recovered from the liquor before recycling. Alkali recovered at concentrations below about 30 percent in chitosan washing is not wasted, since it may be used for protein extraction from crustacea shells in the preliminary process of chitin manufacture, as described in our previously cited U.S. Letters Patent.

EXAMPLE 1

Eighty pounds of dry chitin obtained from King crab shell (Paralithodes camtschatica) was ground to an average particle diameter of 0.0278 inches (24 mesh) and mixed with 320 pounds of 50 percent sodium hydroxide solution and 80 pounds of water using a kneading apparatus. The mixture (5 parts of 40% NaOH per part of chitin) was heated in the mixer to 70° C. and was packed in a polyethylene lined steel drum to expel entrapped air and yield a continuous liquid phase. The drum was sealed and head space air was displaced with nitrogen. It was then held in a chamber at 70° C. for 72 hours. The mixture was then transferred to a screen bottom stainless steel tank and was washed with water by downward displacement. Effluent to 35 percent sodium hydroxide average concentration was collected separately for reuse. Washings to five percent average concentration were also separately collected for protein extraction. The partially washed chitosan was reslurried in water and was collected, washed, dewatered in a centrifuge and dried. Yield equaled 60 pounds or 94 percent of theory.

EXAMPLE 2

Eighty pounds of dry ground chitin as in Example 1 was mixed with 267 pounds of 35 percent sodium hydroxide solution recovered from a previous deacetylation run and 133 pounds of 50 percent sodium hydroxide solution.

The mixture was treated as in Example 1 yielding a product with nearly the same characteristics.

Example 3

One hundred pounds of recovered alkali solution from repeated chitin deacetylations was found to contain 27 percent sodium hydroxide and 20 percent sodium acetate. The solution was cooled to 15° C., held 16 hours and filtered, yielding 19 pounds of crystalline sodium acetate trihydrate and 81 pounds of a solution containing 33 percent sodium hydroxide and 9.5 percent anhydrous sodium acetate. The solution was recycled to the deacetylation process.

Further modifications will occur to those skilled in this art and such are considered to fall within the spirit and scope of the invention as defined in the appended claims.

What is claimed is:

1. A process wherein an alkali solution is used for the deacetylation of ground chitin to yield a soluble chitosan product and in which the alkali solution is recovered and reused in the process, that comprises, kneading the ground chitin with 2 to 7 parts of 35 to 50 percent sodium hydroxide solution per part of chitin, heating the resulting mixture to from 40° to 80° C., packing the mixture in containers to expel entrapped air, sealing the containers and displacing residual air with nitrogen, holding the mixture in a quiescent state at 40° to 80° C. for from 160 to 40 hours, removing the alkali solution, washing and drying the resulting chitosan product, and recovering the removed alkali solution and reusing the same in said process.

2. A process as claimed in claim 1 and in which there is performed the further step of removing sodium acetate from the recovered alkali by crystallization.

3. A process wherein an alkali solution is used for the deacetylation of chitin to yield a soluble chitosan product and in which the alkali solution is recovered and reused, that comprises, mixing the chitin with 2 to 7 parts of 35 to 50 percent sodium hydroxide solution per part of chitin, heating the mixture to from 40° to 80° C., placing the mixture in a container and expelling entrapped air from the container, holding the mixture in a quiescent state at 40° to 80° C. until substantial deacetylation is achieved, removing the alkali solution, washing and drying the resulting chitosan product, and recovering the removed alkali solution and reusing the same.

* * * * *